United States Patent
Han et al.

(10) Patent No.: US 9,615,219 B2
(45) Date of Patent: Apr. 4, 2017

(54) METHOD AND APPARATUS FOR OPERATING A PORTABLE RADIO COMMUNICATION DEVICE IN A DUAL-WATCH MODE

(71) Applicant: MOTOROLA SOLUTIONS, INC, Schaumburg, IL (US)

(72) Inventors: Hui-Min Han, Sichuan (CN); Meng-Ke Duan, Sichuan (CN); Hai-Qing Hu, Sichuan (CN); Han Xiao, Sichuan (CN); Li-Cheng Zhao, Sichuan (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 14/890,401

(22) PCT Filed: May 29, 2013

(86) PCT No.: PCT/CN2013/076420
§ 371 (c)(1),
(2) Date: Nov. 10, 2015

(87) PCT Pub. No.: WO2014/190508
PCT Pub. Date: Dec. 4, 2014

(65) Prior Publication Data
US 2016/0088448 A1     Mar. 24, 2016

(51) Int. Cl.
*H04B 1/38* (2015.01)
*H04W 4/10* (2009.01)
(Continued)

(52) U.S. Cl.
CPC ............... *H04W 4/10* (2013.01); *G10L 15/26* (2013.01); *H04W 4/008* (2013.01); *H04W 4/027* (2013.01);
(Continued)

(58) Field of Classification Search
CPC ......... H04W 88/06; H04W 4/10; H04W 4/22; H04W 76/005; H04W 52/02;
(Continued)

(56) References Cited

U.S. PATENT DOCUMENTS 5,073,972 A * 12/1991 Tendler ................ H04B 1/3877
340/7.5
5,231,699 A * 7/1993 Tendler ................ H04B 1/3805
455/166.2
(Continued)

OTHER PUBLICATIONS

Corresponding International Application No. PCT/CN2013/076220—International Search Report with Written Opinion, mailed Mar. 6, 2014.

*Primary Examiner* — Ajibola Akinyemi

(57) ABSTRACT

A method and apparatus for operating a portable radio communication device is provided. The portable radio communication device receives communications on a primary channel and a secondary channel during a dual-watch mode of operation. The portable radio communication device determines whether the portable radio communication device is proximate to a subject. The portable radio communication device suppresses audio from communications of one of the two channels and plays audio from communications of the other channel when the portable communication device is proximate to the subject. Additionally, the portable radio communication device allows transmission to occur only over the channel in which communication is not suppressed when the portable communication device is proximate to the subject.

18 Claims, 6 Drawing Sheets

(51) Int. Cl.
  *H04W 4/00* (2009.01)
  *G10L 15/26* (2006.01)
  *H04W 4/02* (2009.01)
  H04W 76/00 (2009.01)
  H04B 1/403 (2015.01)
  H04W 88/06 (2009.01)

(52) U.S. Cl.
  CPC .......... *H04B 1/406* (2013.01); *H04W 76/005* (2013.01); *H04W 88/06* (2013.01)

(58) Field of Classification Search
  CPC ... H04W 52/0245; H04W 84/08; H04W 4/18; H04W 76/007; G10L 15/00; G10L 15/02; G10L 2015/088; G10L 25/51
  USPC ....................................................... 455/90.2
  See application file for complete search history.

(56) References Cited

U.S. PATENT DOCUMENTS

| | | | |
|---|---|---|---|
| 2008/0140868 A1* | 6/2008 | Kalayjian | G06F 1/1698 710/8 |
| 2009/0006090 A1* | 1/2009 | Kim | H04N 7/141 704/235 |
| 2010/0137015 A1* | 6/2010 | Blanco | H04W 4/10 455/518 |
| 2011/0306310 A1 | 12/2011 | Bai | |
| 2012/0253796 A1 | 10/2012 | Majima | |

\* cited by examiner

METHOD AND APPARATUS FOR OPERATING A PORTABLE RADIO COMMUNICATION DEVICE IN A DUAL-WATCH MODE

This application is a National Stage filing under 35 USC §371 of co-pending Patent Cooperation Treaty international application having Serial No. PCT/CN2013/076420 (the 'PCT international application') filed on May 29, 2013. This application claims priority to the PCT international application, the entire contents of which are incorporated herein by reference.

FIELD OF THE DISCLOSURE

The present invention relates generally to operations of communication devices and more particularly to portable two-way radio communication devices operating during a dual-watch mode.

BACKGROUND

Portable radios such as hand-held two-way radios are utilized within a variety of public safety environments, such as law enforcement, fire rescue, and emergency medical environments to name a few. Currently, public safety personnel working in the field use two physical radios in order to monitor more than one channel at a time. Using two radios can be cumbersome, and managing the communications from two radios independently can be challenging and may lead to confusion.

Accordingly, there is a need for an improved means for managing multiple received communications.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

Figure 1:
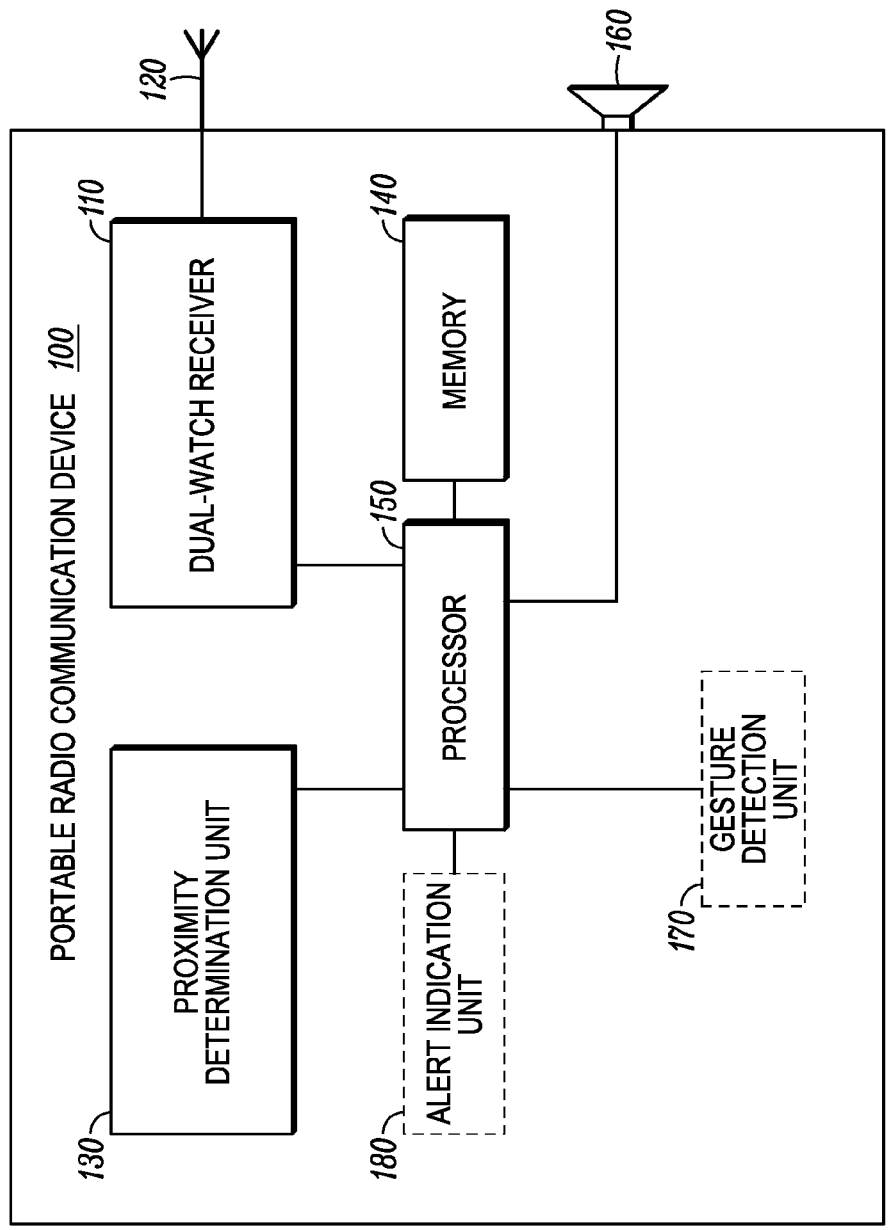
FIG. 1 is a block diagram of a portable radio communication device in accordance with the various embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Briefly, in accordance with the various embodiments, there is described herein, a method and apparatus for operating a portable radio communication device. The portable radio communication device receives communications on a primary channel and a secondary channel during a dual-watch mode of operation. The portable radio communication device determines whether the portable radio communication device is proximate to a subject. For the purposes of this disclosure, the subject may be a person or object with which that the portable radio communication device interacts. By way of a non-limiting example, the term subject may refer to a user of the portable radio communication device, an electronic tag worn by a user of the portable radio communication device, or a ground surface relative to the portable radio communication device. In response to the determination, the portable radio communication device suppresses audio from communications corresponding to only one of the primary channel and the secondary channel and plays audio from communications corresponding to the other of the primary channel and the secondary channel when the portable communication device is proximate to the subject. Hence, based on proximity detection, audio on one of the channels of the portable radio communication is suppressed or played during the dual-watch mode of operation. Additionally, the portable radio communication device allows transmission to occur only over the channel in which communication is not suppressed when the portable communication device is proximate to the subject.

FIG. 1 is a block diagram of a portable radio communication device 100 operating in accordance with various embodiments. The portable radio communication device 100 may be one of a handheld two-way communication radio, a remote speaker microphone (RSM) accessory coupled to the handheld two-way communication radio, or other collaborative electronic accessory device operating with a dual-watch capable radio.

In accordance with the various embodiments of the present disclosure, the portable radio communication device 100 operates in a dual-watch mode in which the portable radio communication device 100 simultaneously monitors (and plays) received communications over a primary channel and a secondary channel. The portable radio communication device 100 comprises a dual-watch receiver 110 coupled to at least one antenna 120, a proximity determination unit 130, a memory 140 storing operating and/or programming instructions, a processor 150 for executing the operating and/or programming instructions stored in the memory 140, and at least one speaker 160. Further, the portable radio communication device optionally comprises a gesture detection unit 170 and an alert indication unit 180. Further, the portable radio communication device 100 includes a transmitter (not shown). Additionally, the portable radio communication device 100 includes one or more input/output interfaces such as keypad(s), display(s), volume control interface(s), encryption on/off interface(s), push-to-talk (PTT) call switch, and/or microphone(s).

The dual-watch receiver 110 of the portable radio communication device 100 is configured to receive radio frequency (RF) signals via at least one antenna 120. In this regard, the dual-watch receiver 110 and the at least one antenna 120 include appropriate conventional circuitry to enable digital or analog communications over a wireless communication channel. Further, the at least one antenna 120 includes any known or developed structure for receiving electromagnetic energy in the RF spectrum. In accordance with various embodiments, the dual-watch receiver 110 is tuned into communications of both the primary channel and the secondary channel via the at least one antenna 120. As used herein, the primary channel and the secondary channel refer to any two different channels of one or more communication systems. In one embodiment, the two different channels may be from a single communication system, such as a public safety-long term evolution (PS-LTE) communication system or a land mobile radio communication (LMR) system. In another embodiment, each of these two different channels may be selected from a different communication system, for example, the primary channel can selected from a first communication system such as the LMR system, and the secondary channel can be selected from a second communication system such as the PS-LTE system. The dual-watch receiver 110 simultaneously monitors wireless communications on both the primary channel and the secondary channels and routes received communications to the at least one speaker 160 on the portable radio communication device 100. In some embodiments, the dual-watch receiver 110 simultaneously monitors wireless communications on both the primary channel and the secondary channel using a single receiving antenna. In another embodiment, the dual-watch receiver 110 periodically toggles to monitor communications on both the primary channel and the secondary channel using a single receiving antenna. In some other embodiments, the dual-watch receiver 110 simultaneously monitors wireless communications on both the primary channel and the secondary channel using two antennas. In this aspect, each of the two antennas is tuned to monitor communications of the primary channel and the secondary channel respectively. Other antenna arrangements are also feasible.

The proximity determination unit 130 of the portable radio communication device 100 determines whether the portable radio communication device 100 is proximate to a subject. The proximity determination unit 130 comprises one or more transducers, sensors, or devices that output an electrical voltage as a function of distance, and optionally, orientation. The proximity determination unit 130 determines whether the portable radio communication device 100 is near or far from the subject based on a comparison of a measured value to a predefined value. In one example, the subject is a user of the portable radio communication device 100, or specifically, a body part of the user of the portable radio communication device 100. In another example, the subject is an electronic tag, such as a radio frequency identification (RFID) tag, worn by the user of the portable radio communication device 100. Further, in another example, the subject is the ground surface relative to the portable radio communication device 100. In one embodiment, the proximity determination unit 130 comprises a proximity sensor, such as an infrared sensor, that determines a distance of the portable radio communication device 100 from the user. In another embodiment, the proximity determination unit 130 comprises a near field communication (NFC) detector that determines whether an RFID tag worn by the user is within the range of the NFC detector. Further, in another embodiment, the proximity determination unit 130 comprises an accelerometer that determines an orientation of the portable radio communication device 100. Consequently, proximity of the portable radio communication device 100 with respect to the ground is registered based on a relative distance between the at least one antenna 120 and the ground surface. For example, a vertical orientation of the portable radio communication device is registered as an orientation in which the at least one antenna 120 is pointing away from the ground, and a horizontal orientation of the portable radio communication device 100 is registered as an orientation in which the at least one antenna 120 is relatively closer to the ground as compared to the vertical orientation. Further, in an embodiment where the portable radio communication device 100 comprises more than one of the proximity sensor, the NFC detector, and/or the accelerometer, one of the sensors from the proximity sensor, the NFC detector, and/or the accelerometer may be selectively activated or selectively prioritized over the other(s) for proximity detection. The selective activation or selective prioritization may be pre-configured or may be configured by a user. Alternately, the selective activation or selective prioritization may be based on a coupling/de-coupling of an accessory to the portable radio communication device 100.

The memory 140 of the portable radio communication device 100 stores operational and programming instructions. The memory 140 can be an integrated-circuit (IC) memory chip containing any form of random-access memory (RAM), a floppy disk, a compact disk with read write (CD-RW), a hard disk drive, a digital versatile disc with read write (DVD-RW), a flash memory card, external subscriber identity module (SIM) card or any other medium for storing digital information. The memory 140 of the portable radio communication device 100, for example, may store a predetermined threshold used for proximity detection.

The processor 150 of the portable radio communication device 100 includes one or more microprocessors, microcontrollers, DSPs (digital signal processors), state machines, logic circuitry, or any other device or devices that process information based on operational or programming instructions stored in the memory 140. In accordance with the various embodiments, the processor 150 sends audio signals to the at least one speaker 160 to play audio from communications corresponding to both the primary channel and the secondary channel when the proximity determination unit 130 determines that the portable radio communication device 100 is not proximate to the subject. Further, the processor 150 suppresses audio from communications corresponding to only one channel (hereinafter referred to as "suppressed channel") of the primary channel and the secondary channel and allows playing of audio from communications corresponding to the other channel (hereinafter referred to as "non-suppressed channel") of the primary channel and the secondary channel when the proximity determination unit 130 determines that the portable radio communication device 100 is proximate to the subject. Additionally, the processor 150 further allows transmissions to occur over the non-suppressed channel when the proximity determination unit 130 determines that the portable radio communication device 100 is proximate to the subject. Moreover, during suppression, the processor 150 either lowers volume or mutes audio of communications corresponding to the suppressed channel. Additionally, the processor 150 routes audio of communications corresponding to the suppressed channel to be stored in the memory 140. Herein, the processor may first convert audio of communications corresponding to the suppressed channel into text and then route the converted text to the memory 140 for storage and/or a display for display of communications corresponding to the suppressed channel as text.

In accordance with the various embodiments, the portable radio communication device 100 additionally comprises the gesture detection unit 170. The gesture detection unit 170 of the portable radio communication device 100 comprises one or more transducers or sensors that detect a gesture associated with the portable radio communication device 100. To avoid false detections, in some embodiments, the gesture detection unit 170 may optionally detect a gesture associated with the portable radio communication device 100 only when the gesture detection is augmented by detection of a touch or contact at the portable radio communication device 100 via a tactile sensor. In one embodiment, the gesture detection unit 170 detects the gesture using an accelerometer. While using the accelerometer, the gesture detection unit 170 detects one or more of an orientation, a direction of orientation, a predefined motion, and/or a direction of a predefined motion associated with the portable radio communication device 100. In another embodiment, the gesture detection unit 170 comprises two microphones, one of which is worn near the shoulder and the other is worn near the chest of the user. Herein, a first gesture may be registered as a tilt of the user's head when the received voice signals at microphone placed at the shoulder of the user register higher signal strength than the voice signals received at the microphone placed at the chest of the user. Correspondingly, a second gesture may be registered as a nod when the received voice signals at microphone placed at the chest of the user register higher signal strength than the voice signals received at the microphone placed at the shoulder of the user.

The gesture detection unit 170 is utilized by the processor 150 in determining (and switching between) the suppressed channel and the non-suppressed channel when the proximity determination unit 130 determines that the portable radio communication device 100 is proximate to the subject. In one case, the processor 150 assigns the secondary channel as the suppressed channel and the primary channel as the non-suppressed channel when the gesture detection unit 170 detects a first gesture associated with the portable radio communication device 100. For example, the first gesture is a left horizontal orientation of the portable radio communication device 100. In another case, the processor 150 assigns (or switches) the primary channel as the suppressed channel and the secondary channel as the non-suppressed channel when the gesture detection unit 170 detects a second gesture associated with the portable radio communication device 100. For example, the second gesture is a right horizontal orientation of the portable radio communication device 100.

In accordance with the various embodiments, the portable radio communication device 100 additionally comprises the alert indication unit 180. The alert indication unit 180 of the portable radio communication device 100 comprises one or more of a light emitting diode (LED) and a speaker. The alert indication unit 180 is configured to present an alert to the user of the portable radio communication device 100 when the proximity determination unit 130 determines that the portable radio communication device 100 is proximate to the subject. In one embodiment, the alert is presented to the user in the form of an audio beep. In another embodiment, the alert is presented to the user in the form of a blinking LED from a plurality of LEDs present on the portable radio communication device 100.

Figure 2:
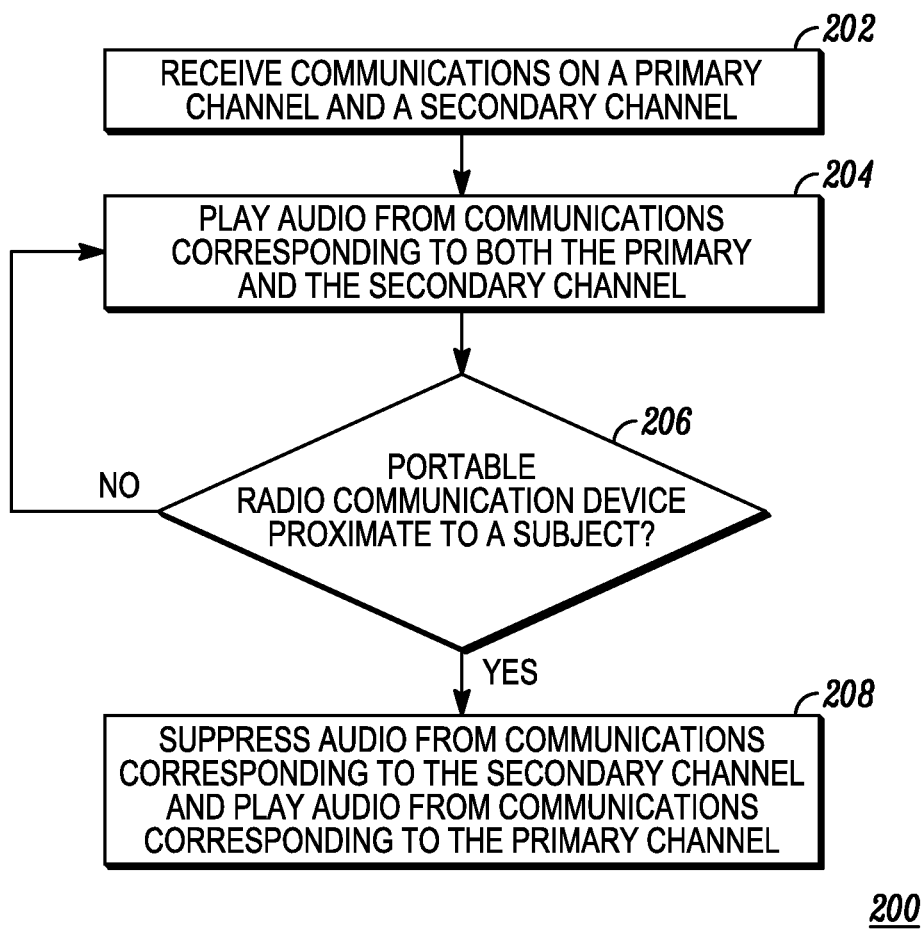
FIG. 2 is a flowchart illustrating a method for operating the portable radio communication device in accordance with the various embodiments of the present disclosure.

FIG. 2 is a flowchart illustrating a method 200 for operating the portable radio communication device 100 of FIG. 1 in accordance with the various embodiments. At 202, the portable radio communication device 100 receives communications on the primary channel and the secondary channel during the dual-watch mode of operation. At 204, the portable radio communication device 100 plays audio from communications corresponding to both the primary channel and the secondary channel. At 206, the portable radio communication device 100, via the proximity determination unit 130, determines whether the portable radio communication device 100 is proximate to a subject. Specifically, the portable radio communication device compares a measured distance between the portable radio communication device 100 and the subject to a predetermined value. Subsequently, the portable radio communication device 100 determines whether the measured distance between the portable radio communication device 100 and the subject is less than the predetermined value. When the measured distance between the portable radio communication device 100 and the subject is greater than the predetermined value, the method 200 returns to 204. When the measured distance between the portable radio communication device 100 and the subject is less than the predetermined value, the method 200 proceeds to 208. At 208, the portable radio communication device 100 suppresses audio from communications corresponding to only one channel (the "suppressed channel") of the primary channel and the secondary channel, plays audio from communications corresponding to the other channel (the "non-suppressed channel") of the primary channel and the secondary channel, and allows transmission to occur over the non-suppressed channel.

Figure 3:
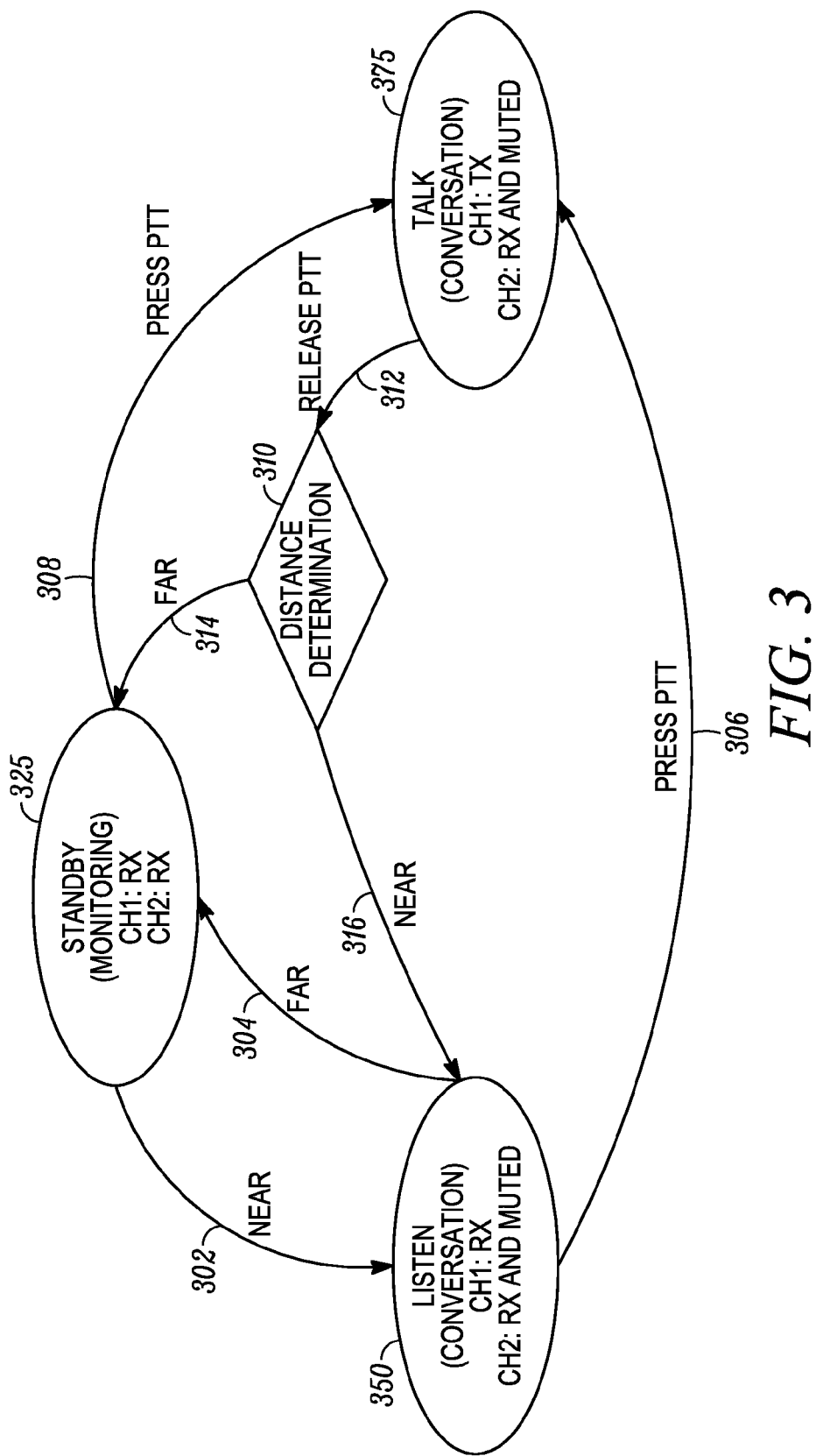
FIG. 3 is a state diagram illustrating various states of operation of the portable radio communication device and methods of transition between the various states in accordance with the various embodiments of the present disclosure.

FIG. 3 is a state diagram illustrating various states of operation the portable radio communication device, such as portable radio communication device 100 of FIG. 1, and methods of transition between the various states in accordance with the various embodiments of the present disclosure. At state 325, the portable radio communication device is in a standby monitoring state where the portable radio communication device is held away from a user and where the portable radio communication device operates in the dual-watch mode of operation receiving (and playing) communications on a first channel CH1 and a second channel CH2, namely, the primary channel and the secondary channel. At 302, the portable radio communication device is brought near the user of the portable radio communication device. This transitions the portable radio communication device into state 350. At state 350, the portable radio communication device is in a listen conversation state where the received communications at the first channel are played at a speaker, and where the received communications at the second channel are muted. When the portable radio communication device is moved away from the body of the user the portable radio communication device transitions from state 350 to state 325 via 304.

While the portable radio communication device is in state 350 and when the push-to-talk (PTT) button is pressed, the portable radio communication device transitions into state 375. At state 375, the portable radio communication device is in a talk conversation state where the transmission is allowed only on the first channel (or a talk-back channel associated with the first channel), and where the received communications at the second channel are muted. State 375 may also be reached from state 325 directly via 308 by pressing of the PTT call button. It is assumed herein, that the action of pressing the PTT call button inherently involves bringing the portable radio communication device sufficiently close to the user to speak into a microphone at the portable radio communication device.

At 312, when transmissions at the first channel are complete, the PTT call button is released. Subsequently, it is determined at 310 whether the portable radio communication device is held near or away from the user. This may be done using the proximity determination unit 130 of FIG. 1. If the portable radio communication is held near the user, the portable communication device transitions to state 350 via 316. Alternately, if the portable radio communication is held away from the user, the portable communication device transitions to state 325 via 314.

Figure 4:
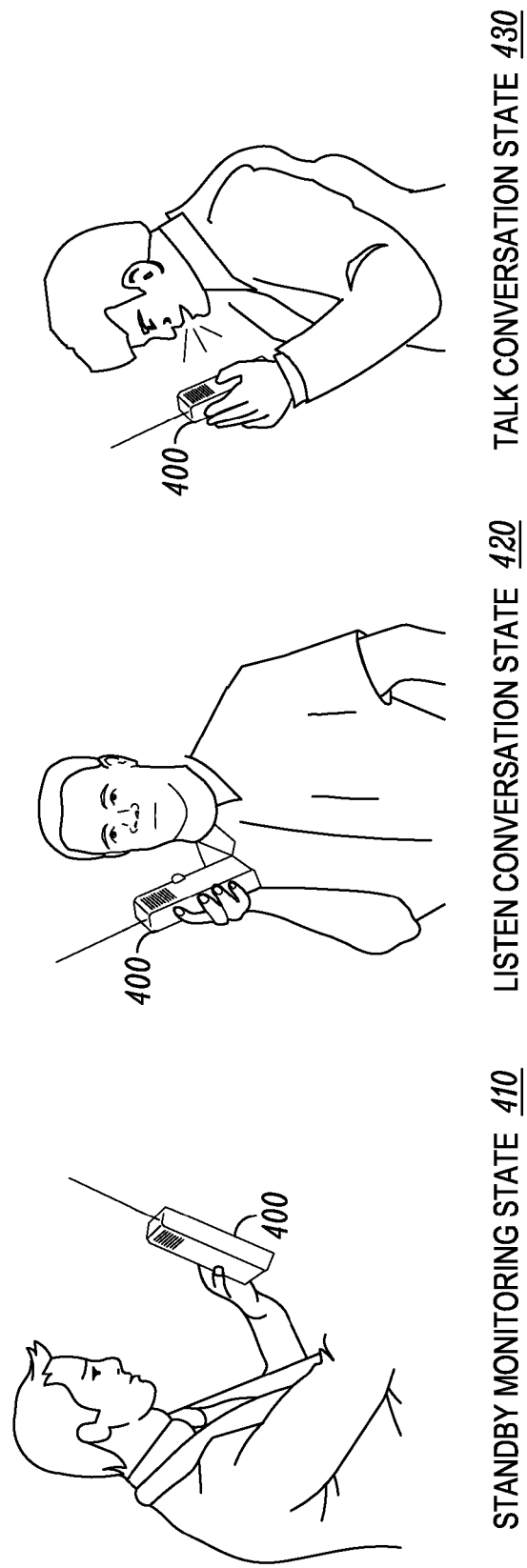
FIG. 4 illustrates the portable radio communication device implemented as a handheld two-way communication radio to demonstrate an example of operation of the portable radio communication device in accordance with the various embodiments of the present disclosure.

FIG. 4 illustrates the portable radio communication device 100 of FIG. 1 implemented as a handheld two-way communication radio 400 to demonstrate an example of operation of the portable radio communication device 100 in accordance with the various embodiments of the present disclosure. In FIG. 4, three states of handheld two-way communication radio 400, namely, a standby monitoring state 410, a listen conversation state 420, and a talk conversation state 430, and the operation of the handheld two-way communication radio 400 corresponding to the three states are shown. The standby monitoring state 410, listen conversation state 420, and a talk conversation state 430 in FIG. 4 correspond to the standby monitoring state 325, listen conversation state 350, and a talk conversation state 375 of FIG. 3 respectively.

During normal operation, the handheld two-way communication radio 400 is in the standby monitoring state 410. In this state, the handheld two-way communication radio 400 is held away from a user. By virtue of this position, it is assumed that the general intention of the user is to monitor communications on both the primary channel and the secondary channel during the dual-watch mode of operation of the handheld two-way communication radio 400. Hence, in the standby monitoring state 410, the handheld two-way communication radio 400 receives and plays communications of both the primary channel and the secondary channel. In some embodiments, the played communications of the primary channel may have a higher volume compared to the played communications of the secondary channel to allow the user to differentiate between communications of both the channels.

When the handheld two-way communication radio 400 is brought near to the user, the handheld two-way communication radio 400 enters the listen conversation state 420. In some embodiments, the handheld two-way communication radio 400 detects whether the handheld two-way communication radio 400 is near the face of the user using a near field communication (NFC) detector. The NFC detector detects whether a radio frequency identification (RFID) tag worn on the collar of the user is within range of detection of the NFC detector. A successful detection indicates that the handheld two-way communication radio 400 is near the face of user. In some other embodiments, the handheld two-way communication radio 400 detects whether the handheld two-way communication radio 400 is near the face of a user using an infrared sensor, and optionally a gravity sensor. The infrared sensor detects presence of an object, in this case, the face of the user, in its object field of view. The gravity sensor detects a vertical upright orientation of the handheld two-way communication radio 400. A successful detection of the presence of the object and of the vertical upright orientation indicates that the handheld two-way communication radio 400 is near the face of user.

In the listen conversation state 420, it is assumed that the intention of the user is to listen to communications of a particular channel of interest out of the primary channel and the secondary channel without being disturbed by played communications of the other channel. In some embodiments, a default channel of interest is the primary channel. Hence, in the listen conversation state 420, the handheld two-way communication radio 400 suppresses communications on the secondary channel (suppressed channel) and plays communications of the primary channel (non-suppressed channel). In some other embodiments, the default channel of interest is the secondary channel. Hence, in the listen conversation state 420, the handheld two-way communication radio 400 suppresses communications on the primary channel (suppressed channel) and plays communications of the secondary channel (non-suppressed channel). For either embodiment, the user is allowed to swap the suppressed channel and the non-suppressed channel via a gesture. By way of a non-limiting example, the gesture is one of a shake of the handheld two-way communication radio 400 and a change in the orientation and/or a direction of orientation of the handheld two-way communication radio 400. For example, when the default channel of interest is the primary channel, and when communications on the secondary channel are suppressed and communications of the primary channel are played, the user may shake the handheld two-way communication radio 400 leading to suppression of communication of the primary channel and play of communications of the secondary channel.

When the handheld two-way communication radio 400 is brought near to the user and when a push-to-talk (PTT) button on the handheld two-way communication radio 400 is pressed, the handheld two-way communication radio 400 enters the talk conversation state 430. In the talk conversation state 430, it is assumed that the intention of the user is to transmit on the particular channel out of the primary channel and the secondary channel without being disturbed by communications of the other channel. Hence, in the talk conversation state 430, the user is allowed to communicate only over the non-suppressed channel (or a talk-back channel associated with the non-suppressed channel) while communications of the suppressed channel are continued to be suppressed.

Figure 5:
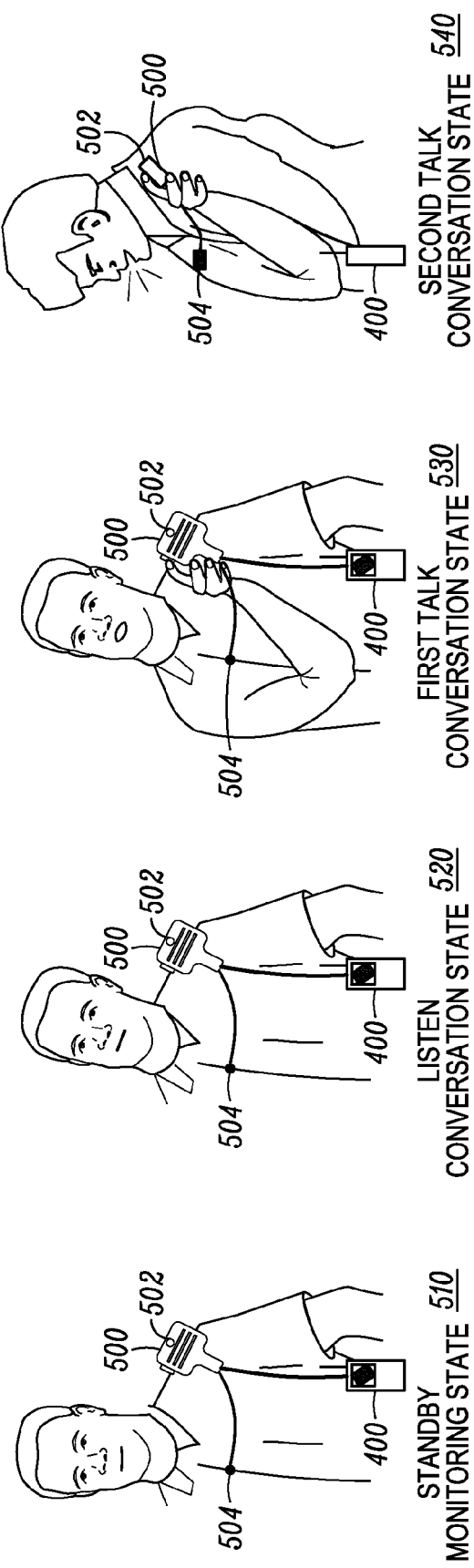
FIG. 5 illustrates the portable radio communication device implemented as a remote speaker microphone accessory to demonstrate another example of operation of the portable radio communication device in accordance with the various embodiments of the present disclosure.

FIG. 5 illustrates the portable radio communication device 100 of FIG. 1 implemented as a remote speaker microphone (RSM) accessory 500 that is coupled to the handheld two-way communication radio 400 of FIG. 4 to demonstrate another example of operation of the portable radio communication device 100 in accordance with the various embodiments of the present disclosure. Generally, the RSM accessories are worn on the shoulder strap of clothing worn by a user. In FIG. 5, four states of RSM accessory 500, namely, a standby monitoring state 510, a listen conversation state 520, a first talk conversation state 530, and a second talk conversation state 540, and the operation of the RSM accessory 500 corresponding to the four states are shown.

During normal operation, the RSM accessory 500 is in the standby monitoring state 510. In this state, the RSM accessory 500 is away from the head of the user. In this position, it is assumed that the general intention of the user is to monitor communications on both the primary channel and the secondary channel during the dual-watch mode of operation. Hence, in the standby monitoring state 510, the RSM accessory 500 receives and plays communications of both the primary channel and the secondary channel. In some cases, the played communications of the primary channel has a higher volume compared to the played communications of the secondary channel to allow the user to differentiate between communications of both the channels.

When the user of the RSM accessory 500 tilts his/her head, that is, when the RSM accessory 500 is proximate to the head of the user, the RSM accessory 500 enters the listen conversation state 520. In some embodiments, the RSM accessory 500 detects the tilt of the user's head using an infrared sensor measuring proximity. In the listen conversation state 520, it is assumed that the intention of the user is to listen to communications of a particular channel of interest out of the primary channel and the secondary channel without being disturbed by communications of the other channel. In some embodiments, a default channel of interest is the primary channel. Hence, in the listen conversation state 520, the RSM accessory 500 suppresses communications on the secondary channel (suppressed channel) and plays communications of the primary channel (non-suppressed channel). In some other embodiments, the default channel of interest is the secondary channel. Hence, in the listen conversation state 520, the RSM accessory 500 suppresses communications on the primary channel (suppressed channel) and plays communications of the secondary channel (non-suppressed channel). For either embodiment, the user is allowed to swap the suppressed channel and the non-suppressed channel via a gesture. By way of a non-limiting example, the gesture is a shake of the handheld two-way communication radio 400 or the RSM accessory 500. For example, when the default channel of interest is the primary channel, and when communications on the secondary channel are suppressed and communications of the primary channel are played, the user may shake the handheld two-way communication radio 400 (or the RSM accessory 500) leading to suppression of communication of the primary channel and play of communications of the secondary channel.

When the user of the RSM accessory 500 tilts his/her head and when a push-to-talk (PTT) button on the RSM accessory 500 is pressed, the RSM accessory 500 enters the first talk conversation state 530. In the first talk conversation state 530, it is assumed that the intention of the user is to transmit on the particular channel out of the primary channel and the secondary channel without being disturbed by communications of the other channel. Hence, in the first talk conversation state 530, communications take place only over the non-suppressed channel (or a talk-back channel associated with the non-suppressed channel) while communications of the suppressed channel are continued to be suppressed.

In some embodiments, the RSM accessory 500 of FIG. 5 comprises a microphone array including at least two microphones. While one microphone 502 of the at least two microphones is placed in the RSM accessory 500, the other microphone 504 is strapped on a lapel of the clothing worn by the user. When push-to-talk (PTT) button on the RSM accessory 500 is pressed, the RSM accessory determines on which channel of the primary channel and the secondary channel to allow transmission based on the comparison of a signal strength of voice of the user received at the at least two microphones 502 and 504. When the user tilts his/her head towards the RSM accessory 500, microphone 502 receives higher signal strength of voice of the user as compared to microphone 504. This retains the RSM accessory 500 in the first talk conversation state 530. By way of a non-limiting example, in the first talk conversation state 530, the RSM accessory allows transmission on the primary channel. Complimentarily, when the user lowers his/her head towards his/her chest, microphone 504 receives higher signal strength of voice of the user as compared to microphone 502. This transitions the RSM accessory 500 in the second talk conversation state 540. By way of a non-limiting example, in the second talk conversation state 540, the RSM accessory allows transmission on the secondary channel.

Figure 6:
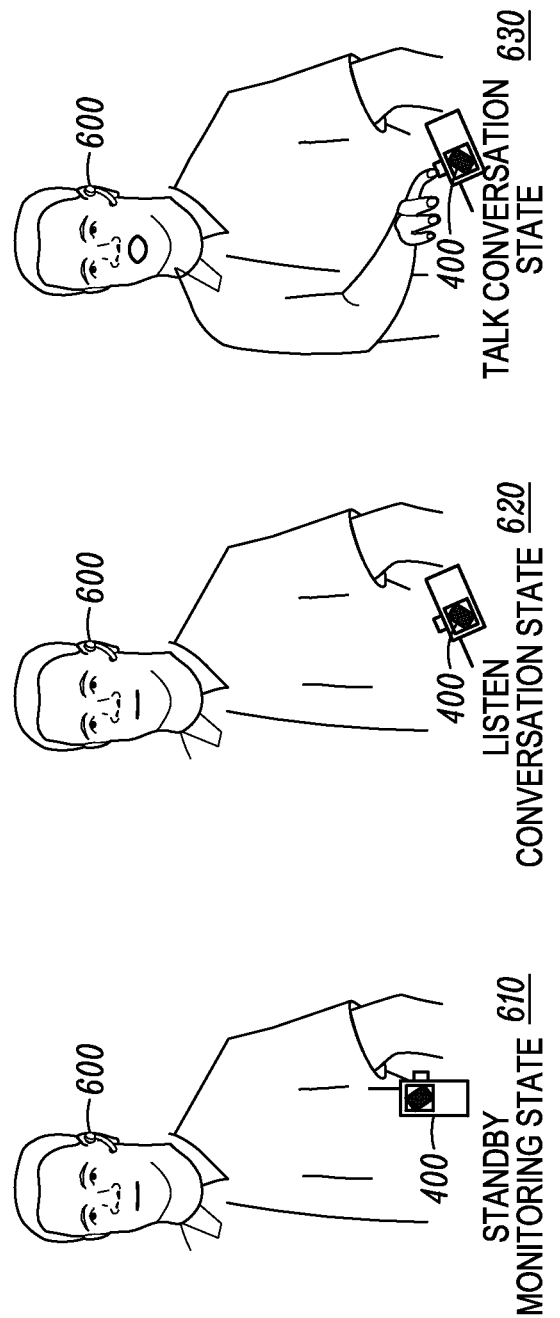
FIG. 6 illustrates the portable radio communication device implemented as a wireless earpiece coupled to the handheld two-way communication radio to demonstrate a yet another example of operation of the portable radio communication device in accordance with the various embodiments of the present disclosure.

FIG. 6 illustrates the portable radio communication device 100 of FIG. 1 implemented as a wireless earpiece 600 coupled to the handheld two-way communication radio 400 of FIG. 4 to demonstrate a third example of operation of the portable radio communication device 100 in accordance with the various embodiments of the present disclosure. In FIG. 6, three states of the wireless earpiece 600 coupled to the handheld two-way communication radio 400, namely, a standby monitoring state 610, a listen conversation state 620, and a talk conversation state 630, and the operation of the wireless earpiece 600 coupled to the handheld two-way communication radio 400 corresponding to the three states are shown. The standby monitoring state 610, listen conversation state 620, and a talk conversation state 630 in FIG. 5 correspond to the standby monitoring state 325, listen conversation state 350, and a talk conversation state 375 of FIG. 3.

During normal operation, the wireless earpiece 600 coupled to the handheld two-way communication radio 400 is in the standby monitoring state 610. In this state, an antenna on the handheld two-way communication radio 400 is oriented away from the ground surface. Specifically, the handheld two-way communication radio 400 is oriented in a vertical upright orientation. It is assumed that the general intention of the user in this state is to monitor communications on both the primary channel and the secondary channel and look for information of interest during the dual-watch mode of operation. Hence, in the standby monitoring state 510, the wireless earpiece 600 coupled to the handheld two-way communication radio 400 receives and plays communications of both the primary channel. In some cases, the played communications of the primary channel has a higher volume compared to the played communications of the secondary channel to allow the user to differentiate between communications of both the channels.

When the user of the handheld two-way communication radio 400 orients the handheld two-way communication radio 400 in a horizontal position, that is, when the antenna of the handheld two-way communication radio 400 is relatively proximate to the ground as compared to the vertical orientation, the wireless earpiece 600 coupled to the handheld two-way communication radio 400 enters the listen conversation state 620. In some embodiments, the handheld two-way communication radio 400 detects the change in orientation using an accelerometer. In the listen conversation state 620, it is assumed that the intention of the user is to listen to communications of a particular channel of interest out of the primary channel and the secondary channel without being disturbed by communications of the other channel. In some embodiments, a first horizontal orientation, such as a left horizontal orientation, indicates that the primary channel is a default channel of interest. Hence, in the listen conversation state 620, the handheld two-way communication radio 400 suppresses communications on the secondary channel (suppressed channel) and plays communications of the primary channel (non-suppressed channel) on the wireless earpiece 600. In some other embodiments, a second horizontal orientation, such as a right horizontal orientation, indicates that the secondary channel is the default channel of interest. Hence, in the listen conversation state 620, the handheld two-way communication radio 400 suppresses communications on the primary channel (suppressed channel) and plays communications of the secondary channel (non-suppressed channel) on the wireless earpiece. For either embodiment, the user is allowed to swap the suppressed channel and the non-suppressed channel by a change in orientation, such as a change in orientation between the first horizontal orientation to the second horizontal orientation and vice versa.

When the handheld two-way communication radio 400 is oriented in the horizontal orientation and when a push-to-talk (PTT) button on the handheld two-way communication radio 400 is pressed, the wireless earpiece 600 coupled to the handheld two-way communication radio 400 enters the talk conversation state 630. In the talk conversation state 630, it is assumed that the intention of the user is to transmit on the particular channel of the primary channel and the secondary channel without being disturbed by communications of the other channel. Hence, in the talk conversation state 630, the user is allowed to communicate only over the non-suppressed channel (or a talk-back channel associated with the non-suppressed channel) while communications of the suppressed channel are continued to be suppressed. Further, the determination of the channel to be suppressed is made on the basis of whether the horizontal orientation of the handheld two-way communication radio 400 is the first horizontal orientation or the second horizontal orientation.

The present disclosure utilizes dual-watch capability of portable radio communication devices to mitigate the need for public safety officers to carry two devices for communicating with two different talk groups over two different channels simultaneously. Further, by suppressing audio from communications corresponding to only one of the primary channel and the secondary channel and playing audio from communications corresponding to the other of the primary channel and the secondary channel using near/far determination, the present disclosure also allows the public safety officer to intuitively focus on communications of a single talk group, if and when the need arises. Also, a gesture controlled selection of the suppressed channel and the non-suppressed channel allows the public safety officer to control a particular channel on which the public safety officers need to focus on.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for operating a portable radio communication device, the method comprising:
    receiving communications on a primary channel and a secondary channel simultaneously during a dual-watch mode of operation;
    determining whether the portable radio communication device is proximate to a subject during the dual-watch mode of operation; and
    as a function of the determining, suppressing audio from communications corresponding to only one of the primary channel and the secondary channel and playing audio from communications corresponding to the other of primary channel and the secondary channel when the portable communication device is determined to be proximate to the subject; and
    as a function of the determining, playing audio from communications corresponding to both the primary channel and the secondary channel when the portable communication device is determined to be not proximate to the subject.

2. The method of claim 1, further comprising:
    allowing transmissions to occur over the other of the primary channel and the secondary channel when the portable communication device is proximate to the subject.

3. The method of claim 1, wherein determining whether the portable radio communication device is proximate to a subject further comprises:
   determining whether a distance between the portable radio communication device and the subject is less than a predetermined value.

4. The method of claim 1, wherein the portable radio communication device comprises one of:
   a two-way communication radio; and
   a remote speaker microphone 'RSM' accessory communicatively coupled to the two-way communication radio.

5. The method of claim 4, wherein the audio is played at one or more of the two-way communication radio, the RSM accessory, and an earpiece accessory communicatively coupled to the two-way communication radio.

6. The method of claim 1, wherein determining whether the portable radio communication device is proximate to the subject comprises one or more of:
   determining, using a proximity sensor, whether the portable radio communication device is proximate to a body part of a user of the portable radio communication device;
   determining, using a near field communication detector, whether a radio frequency identification tag worn by the user of the portable radio communication device is within range of the near field communication detector; and
   determining, using an accelerometer, whether the portable radio communication device is proximate to the ground surface based on an orientation of the portable radio communication device.

7. The method of claim 6, wherein determining whether the portable radio communication device is proximate to the ground surface based on an orientation of the portable radio communication device further comprises:
   registering that the portable radio communication device is proximate to the ground surface when the portable radio communication device is held in an horizontal orientation relative to the ground surface; and
   registering that the portable radio communication device is not proximate to the ground surface when the portable radio communication device is held in a vertical orientation relative to the ground surface.

8. The method of claim 1, further comprising one or more of:
   storing audio from communications corresponding to the one of the primary channel and the secondary channel; and
   converting audio from communications corresponding to the one of the primary channel and the secondary channel into text and displaying the converted text on a display.

9. The method of claim 1, wherein suppressing audio from communications comprises one of:
   muting audio from communications; and
   lowering volume of audio from communications.

10. The method of claim 1, further comprising:
    in response to suppressing audio from communications, detecting a gesture associated with the portable radio communication device; and
    based on the detected gesture, suppressing audio from communications corresponding to the other of the primary channel and the secondary channel and playing audio from communications corresponding to the one of the primary channel and the secondary channel.

11. A portable radio communication device comprising:
    at least one receiver for receiving communications on a primary channel and a secondary channel simultaneously during a dual-watch mode of operation;
    a proximity determination unit for determining whether the portable radio communication device is proximate to a subject; and
    as a function of determining, a processor coupled to the proximity determination unit suppressing audio from communications corresponding to one of the primary channel and the secondary channel and allowing play of audio communications corresponding to the other of the primary channel and the secondary channel when the portable communication device is determined to be proximate to the subject and playing of audio from communications corresponding to both the primary channel and the secondary channel when the portable communication device is determined to be not proximate to the subject.

12. The portable communication device of claim 11, wherein the processor allows transmissions over the other of the primary channel and the second channel when the portable communication device is proximate to the subject.

13. The portable communication device of claim 11, wherein the proximity determination unit further determines whether a distance between the portable radio communication device and the subject is less than a predetermined value.

14. The portable communication device of claim 1, wherein the portable radio communication device comprises one of a two-way communication radio and a remote speaker microphone 'RSM' accessory communicatively coupled to the two-way communication radio.

15. The portable communication device of claim 14, wherein the audio is played at one or more of the two-way communication radio, the RSM accessory, and an earpiece accessory communicatively coupled to the two-way communication radio.

16. The portable communication device of claim 11, wherein the proximity determination unit comprises one or more of a proximity sensor, a near field communication detector, and an accelerometer, and wherein the proximity determination unit performs one or more of:
    determining, using the proximity sensor, whether the portable radio communication device is proximate to a body part of a user of the portable radio communication device;
    determining, using the near field communication detector, whether a radio frequency identification tag worn by the user of the portable radio communication device is within range of the near field communication detector; and
    determining, using the accelerometer, whether the portable radio communication device is proximate to the ground surface based on an orientation of the portable radio communication device.

17. The portable radio communication device of claim 11, wherein the processor performs one or more of:
    storing audio from communications corresponding to the one of the primary channel and the secondary channel at a memory; and
    converting audio from communications corresponding to the one of the primary channel and the secondary channel into text and displaying the converted text at a display.

18. The portable radio communication device of claim 11, further comprising:

a gesture detection unit for detecting a gesture associated with the portable radio communication device in response to the processor suppressing audio from communications, wherein the processor suppresses audio from communications corresponding to the other of the primary channel and the secondary channel and allows playing audio from communications corresponding to the one of the primary channel and the secondary channel based on the detected gesture.

* * * * *